Aug. 30, 1927.  
J. L. WHEELER ET AL  
1,640,387  
AUTOMATICALLY CONTROLLED SHUTTER FOR MEASURING MACHINES  
Filed March 30, 1922  
2 Sheets-Sheet 1
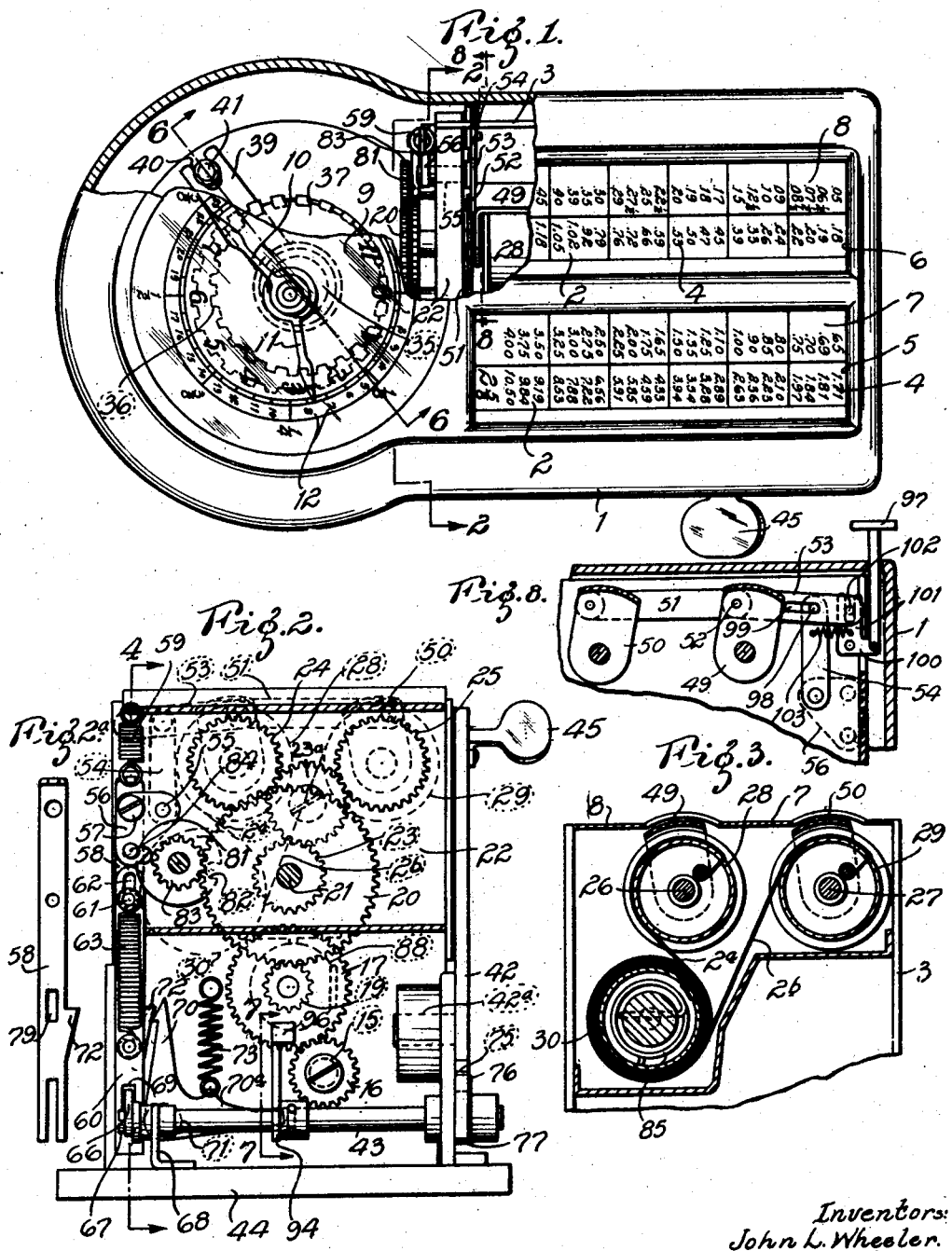

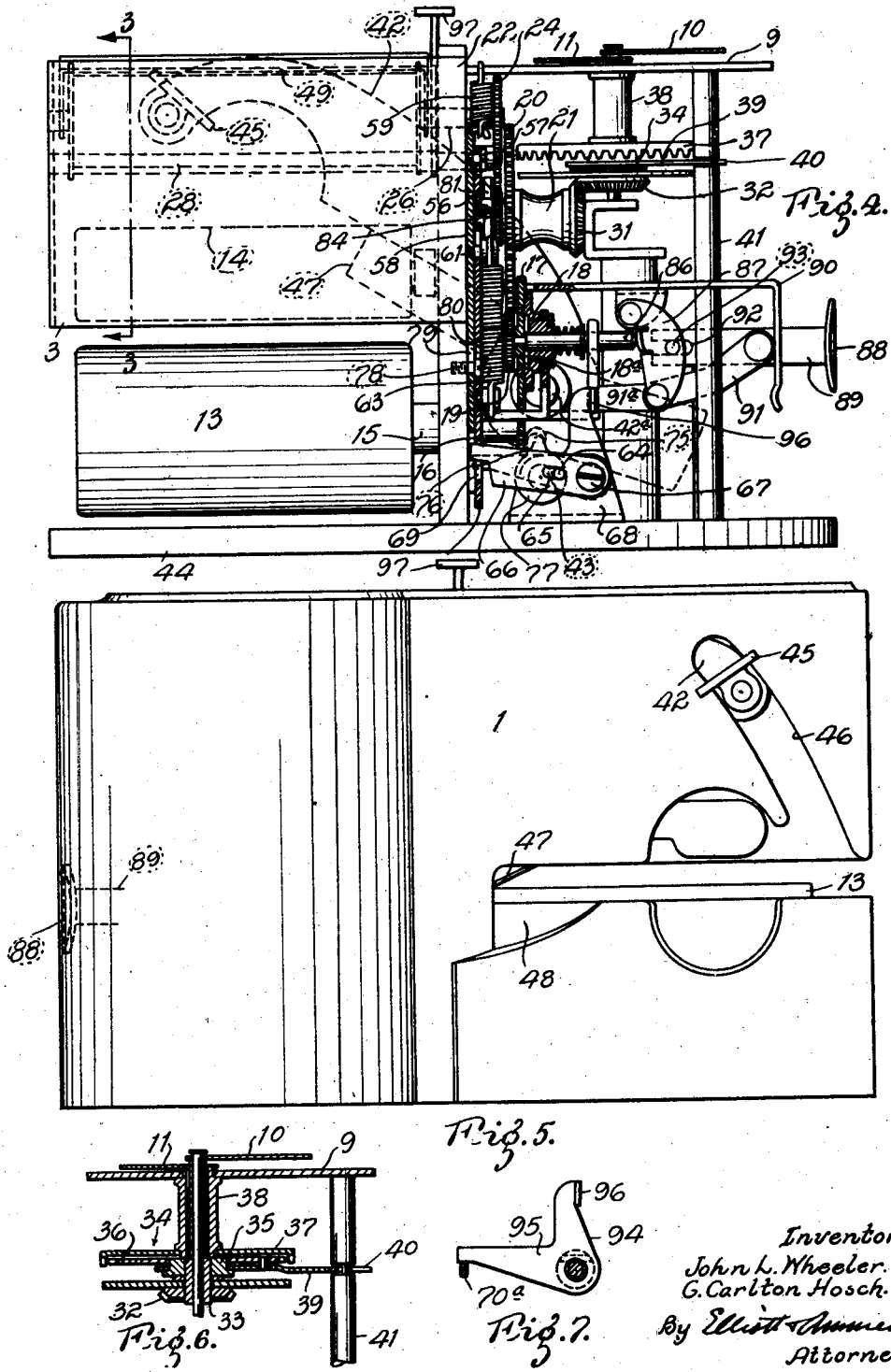

Patented Aug. 30, 1927.

1,640,387

UNITED STATES PATENT OFFICE.

JOHN L. WHEELER AND GREENE CARLTON HOSCH, OF ST. LOUIS, MISSOURI, ASSIGNORS TO THE MEASUREGRAPH COMPANY, A CORPORATION OF DELAWARE.

AUTOMATICALLY-CONTROLLED SHUTTER FOR MEASURING MACHINES.

Application filed March 30, 1922. Serial No. 547,954.

This invention relates to measuring and computing machines of the type in which an indicating member is used which bears computed numbers which correspond to, or are functions of the measured length. The invention is especially applicable to a machine of this general type for measuring and computing the cost of fabric. In such a machine the computed numbers on the indicating member do not necessarily correspond to all the measurements which the machine is capable of making. For example, the computed numbers may correspond to all measurements increasing by an eighth of a yard, while the machine is capable of measuring inches.

The general object of the invention is to provide a shutter at the reading point of the machine which will operate to prevent reading the computed number unless it is accurately presented at the reading point, as a consequence of which the machine would indicate precisely the length to which the computed number corresponds; and to provide such a machine with hand-operated and automatic means for opening the shutter; and to provide a marking device for marking the fabric at the point where it is to be cut off, which operates automatically to open the shutter if the computed number is accurately aligned with the reading point; and also to provide means whereby the marking means may be operated in any measuring position of the indicator, without necessarily actuating the shutter, enabling the machine to be used to measure and cut any length desired and measured in inches whether the measurement is commensurable in eighths of a yard or not; also to provide automatic means for holding the shutter open after it has been opened by the actuation of the marking means, and for automatically effecting the closing of the shutter when the indicating mechanism of the machine is reset to zero; and to provide a construction that will enable the shutter to be opened at will by hand in any position of the chart and without locking the shutter in its open position.

Further objects of the invention will appear hereinafter.

The invention consists in the novel features, and in the general combination of parts to be particularly described hereinafter, all of which contribute to produce a simple and efficient automatically controlled shutter for measuring machines. A preferred embodiment of our invention will be particularly described in the following specification, while the broad scope of our invention will be pointed out in the appended claims.

In the drawing,

Figure 1 is a plan of a fabric measuring and cost computing machine embodying our invention and partially broken away to show the mechanism involved in the invention;

Figure 2 is a vertical section taken about on the line 2—2 of Figure 1;

Figure 2$^a$ is a detail showing one of the parts of the mechanism in elevation;

Figure 3 is a vertical section taken about on the line 3—3 of Figure 4 but omitting parts except those that relate to the invention;

Figure 4 is a view showing the framing of the machine in side elevation with the casing removed and also showing part of the mechanism as though viewed in vertical section on the line 4—4 of Figure 2;

Figure 5 is a side elevation of the complete machine;

Figure 6 is a vertical section taken about on the line 6—6 of Figure 1 but omitting parts except those which relate to the reduction gear which this view illustrates; and Figure 7 is a vertical section on the line 7—7 Fig. 2, showing a detail of the means for automatically controlling the shutter by the resetting mechanism.

Figure 8 is a vertical section taken on the line 8—8 of Figure 1 and particularly illustrating the hand-operated means for opening the shutter independently of the automatic means.

In the machine illustrated 1 represents a casing provided with an indicating member which may be in the form of two charts 2$^a$ and 2$^b$ supported in the upper part of the frame 3 of the machine so as to enable them to present computed numbers 4 at the reading point, or reading points of the machine. In the present instance these numbers 4 are disposed in rows which are presented in succession at two windows 5 and 6 which constitute the reading points for the machine. These windows 5 and 6 are provided with scales 7 and 8, respectively, which carry numbers indicating different price rates, and the computed numbers of the chart indicate the charge to be made for the quantity measured at any of the price rates indicated on the scales.

Means is provided on the charts for indicating the length measured. Referring to Figure 1 the number 25⅝ near the lower edge of the chart as viewed by the operator at the left of the machine shows that the machine is now indicating a measurement of 25⅝ yards. In addition to this indicating means we also provide length indicating means including a dial 9 in the upper portion of the casing, and provided with a fast moving pointer 10 and a slow moving pointer 11, the former of which co-operates with the small numbers 12 of the dial scale which indicate inches; the pointer 11 co-operates with the large numbers of the scale which indicate yards. The scale on the dial also includes numbers indicating fractions of a yard increasing by eighths. The pointer 10 makes one complete revolution in measuring a yard while the pointer 11 is co-operating with the large numbers to indicate a measurement of one yard.

When the machine is in operation the fabric is pulled between a measuring roller 13 (see Figure 4) and a presser roller 14 which is then pressed down upon the measuring roller. The rotation of the measuring roller 13 is imparted to the indicating members or charts 2ª and 2ᵇ and also to the indicating pointers 10 and 11. Any suitable gear train may be provided for this purpose, such as that indicated in Figures 2 and 4, in which the shaft 15 of the measuring roller is provided with a pinion 16 driving a gear wheel 17, the same being provided with a friction clutch 18; the driven member 18ª of this clutch is rigid with a pinion 19 which meshes with a large gear 20 secured at one end of a horizontal arbor 21, the inner end of which is supported in a vertical frame plate 22. The end of this arbor 21 adjacent to the frame plate 22 carries a pinion 23 which meshes with a gear 23ª which in turn meshes with two gear wheels 24 and 25, respectively, the shafts 26 and 27 of which carry take-up rollers 28 and 29 upon which the charts 2ª and 2ᵇ wind. When the charts are in the zero position they are wound in coils on a supply roller or drum 30 (see Figure 3).

In order to drive the hands 10 and 11, the arbor 21 is provided with a bevel gear 31 which drives a bevel gear 32 on the lower end of a tubular shaft 33 (see Figure 6). This tubular shaft carries the fast moving pointer 10 and operates through a reduction gear 34 (see Figure 4) to drive the slow moving pointer 11 at its proper speed. The reduction gear may be of any suitable type. We have illustrated the simple reduction gear of the oscillating type involving the use of an eccentric 35 on the tubular shaft 33 which is rotatably mounted in an opening in an oscillating gear wheel 36, the teeth of which mesh with the teeth of a crown wheel 37 which is rigidly secured to an outer tubular shaft 38 carrying rigidly the slow moving pointer 11. The oscillating gear 36 is prevented from rotating by an arm 39 attached to it and which is guided to move in a radial direction by means of a slide 40 in its outer end engaging a reduced neck on a stanchion or post 41 which forms part of the frame.

The machine includes marking means for marking the fabric at the point where it is to be cut off and this may include a marking lever or knife lever 42 (see Figs. 2 and 4) which is mounted on a horizontal pin 42ª. The knife lever actuates a shaft 43 and is provided with a thumb-plate 45 which is exposed on the exterior of the casing through a slot 46 (see Fig. 5). The lever 42 carries a knife 47 which co-operates with a fixed knife 48 to mark the fabric after it has been measured.

In applying our invention to such a machine we provide a shutter device including two rotary shutters 49 and 50 (see Figs. 1 and 3), and we provide automatic means actuated by the movement of some part of the machine after making the measurement, which operates to open the shutters. For this purpose, the shutters are rotatably mounted on the shafts 26 and 27 of the take-up rollers 28 and 29 and adjacent to the frame plate 22 they are connected together by a link 51 (see Figure 1). The pin 52 which attaches the link 51 to the shutter 49 also affords means for attaching a link 53 which is actuated by an arm 54 mounted on a shaft 55 in the frame plate 22 and passing to the other side of the frame plate. We provide means for rotating the shaft 55 when a part such as the marking lever is operated after the measurement is made, but we also provide means for preventing the opening movement of the shutter unless two of the rows of the computed numbers 4 on the charts are properly aligned at the reading points or windows 5 and 6.

In order to accomplish this we provide the rock shaft 55 with a lever plate 56 which may be of substantially triangular form (see Fig. 2), the outer portion of the plate being pivotally attached by a pivot screw 57 to a slide 58 guided to move in a vertical direction on the face of the frame plate 22. A coiled spring 59 is attached to the upper end of this slide and the function of this spring is to return slide 58 after actuation by the marking means. We provide a connection from the shaft 43 to this slide for pulling the slide down and thereby actuating the rock shaft 55 to open the shutters, and this connection includes a link 60 lying on the outer face of the slide 58 and connected to the slide by a pin 61 and slot 62, the pin being secured in the slide. A spring 63 is provided, the lower end of which is attached to the link and the upper end attached to the pin 61. Hence, if the link is pulled downwardly it will exert a downward pull through the spring 63 upon the slide, the downward movement of the link being permitted by the slot 62. The link 60 will be pulled down by the rotation of the shaft 43 by reason of the fact that the shaft 43 has a pin 64 received in a slot 65 in a dog 66, (see Figure 4) which is pivotally mounted at 67 on a bracket 68 mounted on the base plate 44. The end of this dog is received in a slot 69 formed in the lower end of the link for actuating the link by the dog.

We prefer to hold the shutters open after the link 60 has pulled the slide 58 down, by detent means such as a detent pawl 70 which may be pivotally mounted at 71 near the vertical face of the frame plate 22 so as to co-operate with a detent tooth 72 which projects from the edge of the slide 58 (see Figure 2). This detent pawl is moved into its engaging position by a spring 73.

The shaft 43 is located just below the pivot or shaft 42$^a$ of the lever 42. Just below the lever pivot 42$^a$ the lower edge of the lever 42 is provided with a notch 75 which co-operates with a dog 76 which projects up from a collar 77 rigidly attached to the shaft 43 (see Figures 2 and 4).

Referring to Figure 4 it will be evident that when the lever 42 is depressed the dog 66 will also be depressed and this will move the link 60 to open the shutters. When the link is moved in this way the detent pawl or latch 70 will operate to hold the shutters open. The slide 58 is guided on the frame plate 22 by means of a screw 78 the shank of which passes through a slot 79 in the slide, the head of the screw being received in the large slot 80 formed in the link 60.

The means for preventing the operation of the knife lever from opening the shutters unless the numbers 4 of the charts are properly aligned includes a locking device 81 which is in the form of a disk having one or more notches 82 in its edge, and this disk is driven in synchrony with the charts by means of a pinion 83 carried on its shaft, which pinion meshes with the large gear wheel 20, already described (see Figure 2). The gears 20 and 83 are of such a ratio that this disk 81 will make one-half of a revolution for every eighth of a yard of advance of the charts. And whenever one of the rows 4 (which correspond to a length commensurable in eighths of a yard) lies opposite its reading point, then one of the notches 82 will be presented opposite to a pin 84 which projects out from the face of the rocking plate 56. If the length indicated by the machine corresponds to any of the intermediate lengths which have no corresponding computed numbers on the indicating members, or charts, then the movement of the pin 84 will be obstructed by the disk 81 and the shutters will not open, but by reason of the flexible connection of the spring 63, the operation of the knife lever will not be prevented. This enables the machine to be used for measuring and cutting off any quantity which the machine is capable of measuring. If the quantity measured is commensurable in eighths of a yard the shutters will open automatically to show the operator what charge should be made for the amount cut off.

We provide automatic means for effecting the closing of the shutters, assuming that they have been opened by the operation of the knife lever. In the present instance we effect this simply by releasing the detent pawl 70 automatically by the resetting movement. In this machine the resetting of the indicating mechanism to zero is effected by means of a coil spring 85 within the drum 30 (see Figure 3). This spring will operate to return the indicating mechanism to zero if the clutch 18 is opened, and the resetting is effected by opening the clutch by pressing the outer end of the clutch stem 86 (see Figure 4). This is effected by means of a lever 87 which is actuated by means of a hand-actuated resetting member or button 88 which is exposed on the exterior of the casing (see Figure 5). This resetting member has a flat stem 89 guided to slide through a suitable bracket 90, and beyond the bracket is provided with a link 91 which extends downwardly and has a pivotal connection with the lower end of the lever 87. The inner end of the stem 89 is guided by means of a slot 92 on a pin 93 carried on the lever 87. In order to enable this resetting member to release the pawl 70 we provide the shaft 43 with a loose rocker 94 which is in the form of a bell crank lever (see Figure 7) one arm 95 of which projects over so as to engage the upper side of a horizontal arm 70$^a$ which operates as a tail for the pawl 70. The bell crank lever 94 has an upwardly extending arm terminating in a push plate 96 which is directly in line with an extension 91$^a$ which forms the forward end of the aforesaid link 91. The clutch member 18$^a$ referred to above is carried by the stem 86 so that when the thumb-plate 88 is shoved in the clutch will be opened. When the clutch is opened the spring 85 will return the indicating mechanism to zero; at the same time the forward end of the link 91 will operate through the bell-crank lever 94 to release the pawl 70, and the shutter spring will then close the shutters.

In such a machine it is desirable for the operator to open the shutter at will independently of the marking means. In order to enable this to be accomplished we provide a hand-operated member or push button 97, the stem of which passes vertically downward through the upper wall of the casing 1 (see Figure 8). This push-button is connected in any suitable manner with the aforesaid link 53 which is actuated by the member or arm 54 controlled by the operation of the marking means 42. In order to enable either the arm 54 or the push-button 97 to actuate this link we provide a lost-motion connection between the arm and the link consisting of a pin 98 on the arm and a slot 99 in the link. The push-button 97 operates the link through a bell crank lever 100 the vertical arm 101 of which has a slot receiving a pin 102 on the end of the link. A spring 103 returns this push-button to its elevated position after it has been actuated and also returns the shutters to their closed position after the push button is released.

We shall now describe the general mode of operation of the entire machine.

By pulling the fabric to be measured through the machine the measuring roller 13 is rotated and by reason of its pinion 16 the movement is imparted through the gear train including the large gear 20 (see Figure 2) so as to effect the rotation of the gear wheels 24 and 25. This effects the rotation of the take-up rollers 28 and 29 and winds the charts 5 and 6 off of the drum 30. The spring 85 (see Figure 3) maintains the charts taut. When the desired amount of fabric has been measured off the operator presses down on the thumb-plate 45 which operates the marking lever 42. This notches the edge of the farbric at the point where it is to be cut off through the medium of the blades 47 and 48.

The measuring movement is imparted to the pointers 10 and 11 on the measuring dial 9 through the bevel gears 31 and 32 and through the reduction gear 34.

The operation of the knife lever also actuates the shaft 43 which, through the dog 66 effects the downward movement of the link 60. This downward movement is imparted through the coil spring 63 to the slide 58, and this moves the rocker plate 56 and rocks the rock-shaft 55. Through the link 53 this rock shaft opens the shutters. The downward movement of the slide 58 brings the detent tooth 72 down so that the spring 73 causes a latch or detent pawl 70 to engage the tooth 72 and this will hold the shutters open so as to expose the reading points on the charts. The shutters will open in the manner described if the machine is indicating a length commensurable in eighths of a yard because at that time one of the notches 82 will be opposite to the pin 84 and this will permit the rocking plate 56 to have free movement. If the machine is not indicating a measurement commensurable in eighths of a yard no row of numbers on the charts will be aligned at the reading points, and hence neither of the notches 82 will be opposite the pin 84. The disk 81 would then prevent the swinging of the rock plate and hence would prevent opening of the shutters. This action of the disk 81, however, would not interfere in any way with the operation of the knife because the springs 63 would simply be extended by the action of the shaft 43 and dog 66 without moving the rocker plate. This mode of operation permits the machine to be used for measuring and cutting off any of the intermediate lengths indicated by the mechanism, but not having corresponding computed numbers, for example, seven inches.

When the indicating mechanism is to be returned to zero the resetting member 88 is pushed inwardly and this operates through the lever 87 to actuate the stem 86 of the clutch 18. This opens the spring clutch 18 and spring 85 then resets the indicating mechanism to zero. The forward end of the link 91 also actuates the rocker 94, the arm 95 of which presses the tail 70ª of the detent pawl 70 (see Figure 7). This releases the pawl and permits the shutter spring 59 to close the shutters.

If it is desired to open the shutter without operating the marking means 42 this can be accomplished simply by depressing the push button 97. This will rock the bell crank 100 and thereby exert a pull in the link 53 which will open the shutters. As soon as the push button is released the spring 103 will pull the shutter closed and also return the push button to its elevated position.

What we claim is:

1. In a measuring and computing machine having an indicating member bearing computed numbers corresponding to different measurements and mounted so as to present the numbers at the reading point of the machine, a measuring roller which actuates the indicating member, a marker for marking the articles measured and a zero setting device, a shutter to cover the reading point of the computed numbers, means connecting the marking means with the shutter to open the same, and means actuated automatically in the resetting operation for effecting the closing of the shutter.

2. In a measuring and cost computing machine having an indicating member bearing computed numbers corresponding to different measurements and mounted so as to present the numbers at the reading point of the machine, length indicating means for indicating the length measured corresponding to the computed numbers and also bearing numbers to indicate intermediate lengths having no corresponding computed numbers on the indicating member, a measuring roller which actuates the indicating member and the length indicating means, marking means for marking the article measured and a zero setting device, a shutter to cover the reading point of the computed numbers, means connecting the marking means with the shutter to effect the opening of the same, means driven in synchrony with the indicating member to prevent the shutter from opening unless one of the computed numbers is presented at the reading point, the connection between the marking means and the shutter including a flexible member to permit the actuation of the marking means when the length indicating means indicates an intermediate length having no corresponding computed number, and means actuated automatically in the resetting operation for effecting the closing of the shutter.

3. In a fabric measuring and cost computing machine having a chart bearing rows of computed numbers corresponding to different measurements, and adapted to present the rows of numbers at the reading point, a measuring roller which actuates the chart, means for indicating the length measured, marking means for marking the fabric and a zero setting device, a shutter to cover the chart at the reading point, means automatically actuated by the operation of the marking means, for opening the shutter, and for maintaining the shutter in its open position to expose the chart, a hand-actuated member for controlling the resetting means, and means actuated by the hand-actuated member for effecting the closing of the shutter.

4. In a fabric measuring and cost computing machine having a chart bearing rows of computed numbers corresponding to different measurements, and adapted to present the rows of numbers at the reading point, a measuring roller which actuates the chart, means for indicating the length measured, marking means for marking the fabric measured and a zero setting device, a shutter to cover the chart at the reading point of the computed numbers, means automatically actuated by the operation of the marking means, for opening the shutter, detent means for maintaining the shutter in its open position to expose the chart and enable the presented number to be read, a hand-actuated member for controlling the resetting means to reset the chart to zero, means actuated by the hand-actuated member for releasing the detent means, and a spring for closing the shutter thereafter.

5. In a fabric measuring and cost computing machine having a chart bearing rows of numbers corresponding to different measurements, a measuring roller which actuates the same during the measuring movement to display the computed numbers at the reading point of the machine, means for indicating the length measured, marking means for marking the article measured, and a zero setting device, a shutter normally held in a position to prevent reading the numbers displayed at the reading point, means actuated by the marking means for opening the shutter, means for preventing the opening of the shutter except when one of said rows is presented at the reading point, means operating automatically to hold the shutter in its open position after it has been opened, a hand-actuated resetting member controlling the zero setting device, and means actuated by the hand-actuated resetting member for releasing the shutter to permit the same to return to its closed position.

6. In a fabric measuring and cost computing machine having a member bearing computed numbers corresponding to different measurements, a casing having a window at which the numbers are displayed, marking means for marking the fabric measured, and a zero setting device, a shutter normally held in a position to prevent reading the numbers displayed at the window, means actuated by the marking means for opening the shutter, means operating automatically to hold the shutter in its open position, a hand-actuated resetting member, controlling the zero setting device, and means actuated by the hand-actuated member for releasing the shutter to permit the same to return to its closed position.

7. In a fabric measuring and cost computing machine having a chart bearing rows of numbers corresponding to different measurements, and adapted to present the rows of numbers in succession at the reading point of the machine, a measuring roller which actuates the chart, means for indicating the length measured, and a marker for marking the fabric measured, a shutter to cover the reading point, a link connected with the shutter for operating the same automatically by the operation of the marker, a connection between the marker and the link, to enable the operation of the marker to open the shutter, a detent cooperating with the link to hold the shutter open, and means for actuating the detent to release the shutter at will, and a spring to close the shutter when released by the detent.

8. In a fabric measuring and cost computing machine having a chart bearing rows of numbers corresponding to different measurements, and adapted to present the rows of numbers in succession at the reading point of the machine, a measuring roller which actuates the chart, means for indicating the length measured, a marker for marking the fabric measured and a zero setting device, a shutter to cover the reading point, a link connected with the shutter for opening the same, a flexible connection between the marker and the link to enable the marker to be operated at all times, a spring for closing the shutter, means driven in synchrony with the chart for preventing the opening of the shutter except when one of the rows of numbers is presented at the reading point, a detent co-operating with the link to hold the shutter open, a hand-actuated member controlling the zero setting device, and means actuated by the said member to release the detent to permit the shutter to close when the machine is reset.

9. In a fabric measuring and cost computing machine having a chart bearing rows of numbers corresponding to different measurements and adapted to present the rows of numbers in succession at the reading point of the machine, means for indicating the length measured, marking means including a marking lever for marking the fabric measured, and a zero setting device, a shaft actuated by the marking lever, a shutter, a spring for holding the shutter in a position to cover the reading point of the chart, means actuated by the shaft for opening the shutter when the marking lever is operated, a detent for holding the shutter open, a hand-actuated member controlling the zero setting device, and means for releasing the detent, actuated by the said member.

10. In a fabric measuring and cost computing machine having a frame including a substantially vertical frame plate, a chart bearing rows of numbers corresponding to different measurements and supported so as to present the rows of numbers in succession at the reading point of the machine, means for indicating the length measured, a marker for marking the fabric measured, and a zero setting device, a shutter, a spring for holding the shutter in a position to cover the reading point of the chart, a link guided to slide adjacent to said frame plate and connected with the shutter to open the same, means for actuating the link by the marker to open the shutter, a detent for engaging the link to hold the shutter open, a hand-actuated member controlling the zero setting device, and means actuated by the member to release the detent and permit the shutter-spring to close the shutter.

11. In a measuring and computing machine, an indicating member bearing computed numbers corresponding to different measurements and mounted so as to present the numbers at the reading point of the machine, means for indicating the length measured, a marker for marking the fabric measured, and a zero setting device, a shutter to cover the reading point, means actuated automatically after the measurement has been made, for opening the shutter, detent means for holding the shutter in an open position after it has been opened by the operation of the automatic means, a resetting button controlling the zero setting device, and actuating the detent means for releasing the same, and a hand-actuated member connected with the shutter and co-operating therewith to open the same at will independently of the automatic means.

12. In a measuring and computing machine having an indicating member bearing computed numbers corresponding to different measurements and mounted so as to present the numbers at the reading point of the machine, means for indicating the length measured, and marking means for marking the article measured, a shutter to cover the reading point, means connecting the marking means with the shutter to open the same automatically when the marking means is actuated, and a hand-actuated member connected with the shutter and co-operating therewith to open the same at will independently of the marking means.

13. In a measuring and computing machine having an indicating member bearing computed numbers corresponding to different measurements and mounted so as to present the numbers at the reading point of the machine, means for indicating the length measured, and marking means for marking the article measured, a shutter to cover the reading point, means connecting the marking means with the shutter to open the same automatically when the marking means is actuated, means for maintaining the shutter in an open position after it has been opened by the operation of the marking means, and a hand-actuated member connected with the shutter and co-operating therewith to open the same at will independently of the marking means.

14. In a measuring and computing machine having an indicating member bearing completed numbers corresponding to different measurements and mounted so as to present the numbers at the reading point of the machine, means for indicating the length measured, and marking means for marking the article measured, a shutter to cover the reading point, means connecting the marking means with the shutter to open the same automatically when the marking means is actuated, detent means for holding the shutter open after the same has been opened by the operation of the marking means, and a hand-actuated member having a lost-motion connection with the shutter enabling the same to open the shutter at will independently of the marking means.

15. In a measuring and computing machine having an indicating member bearing computed numbers corresponding to different measurements and mounted so as to present the numbers at the reading point of the machine, means for indicating the length measured, and marking means for marking the article measured, a shutter to cover the reading point, a link for operating the shutter, a member actuated by the marking means and having a pin and slot connection with the link for moving the link to open the shutter, and a hand-actuated member connected with the link for moving the same at will to open the shutter independently of the marking means.

16. In a fabric measuring and cost computing and indicating machine, in combination with the cutter and the resetting mechanism, a shutter to conceal the computed figures, means operated by the cutter for opening the shutter, and means actuated by the resetting movement to effect the reclosing of the shutter.

In testimony whereof, we have hereunto set our hands.

JOHN L. WHEELER.
GREENE CARLTON HOSCH.